US012656130B2

(12) United States Patent (10) Patent No.: US 12,656,130 B2
Wu et al. (45) Date of Patent: Jun. 16, 2026

(54) METHODS, DEVICES FOR REAL-TIME NEAREST NEIGHBOUR SEARCH ON A ROAD SYSTEM

(71) Applicant: GRABTAXI HOLDINGS PTE. LTD., Singapore (SG)

(72) Inventors: Hao Wu, Singapore (SG); Minglei Su, Singapore (SG); Thanh Dat Le, Singapore (SG); Nuo Xu, Singapore (SG); Guanfeng Wang, Singapore (SG); Mihai Stroe, Tenerife (ES)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 128 days.

(21) Appl. No.: 18/261,548

(22) PCT Filed: Mar. 30, 2022

(86) PCT No.: PCT/SG2022/050182
§ 371 (c)(1),
(2) Date: Jul. 14, 2023

(87) PCT Pub. No.: WO2022/220740
PCT Pub. Date: Oct. 20, 2022

(65) Prior Publication Data
US 2024/0159546 A1 May 16, 2024

(30) Foreign Application Priority Data

Apr. 14, 2021 (SG) ............................ 10202103788P

(51) Int. Cl.
*G01C 21/34* (2006.01)
*G01C 21/36* (2006.01)

(52) U.S. Cl.
CPC ..... *G01C 21/3438* (2013.01); *G01C 21/3446* (2013.01); *G01C 21/3492* (2013.01); *G01C 21/3694* (2013.01)

(58) Field of Classification Search
CPC ............ G01C 21/3438; G01C 21/3446; G01C 21/3492; G01C 21/3694
See application file for complete search history.

(56) References Cited

U.S. PATENT DOCUMENTS

2018/0245934 A1* 8/2018 Zhang .................... G06Q 50/40
2018/0252548 A1* 9/2018 Saito .................. G08G 1/09626
(Continued)

FOREIGN PATENT DOCUMENTS

CN 106961707 A 7/2017
CN 110223515 B * 1/2021 ............. G06N 3/045
(Continued)

OTHER PUBLICATIONS

English translation of CN-112183589-A (Year: 2021).*
(Continued)

*Primary Examiner* — Todd Melton
*Assistant Examiner* — Matthew Ho
(74) *Attorney, Agent, or Firm* — Maschoff Brennan

(57) ABSTRACT

Aspects concern a method for identifying a list of nearest vehicles including receiving a ride request comprising a request position; obtaining vehicle information of a plurality of vehicles, wherein the vehicle information comprises a vehicle position; translating the vehicle position information of each of the plurality of vehicles to positions on an edge based graph, wherein the edge based graph represents a road system; and determining a driving distance between at least one of the vehicle positions of the plurality of vehicles and the request position, wherein the driving distance comprises
(Continued)

a distance the at least one vehicle travels along the road system to reach the request position.

19 Claims, 10 Drawing Sheets

(56)                    References Cited

U.S. PATENT DOCUMENTS

| | | |
|---|---|---|
| 2019/0012064 A1 | 1/2019 | Foerster et al. |
| 2019/0018426 A1* | 1/2019 | Yao ...................... G05D 1/0212 |
| 2019/0120640 A1 | 4/2019 | Ho et al. |
| 2020/0167883 A1* | 5/2020 | Yamashita ............. G08G 1/202 |
| 2022/0074751 A1* | 3/2022 | Klang .................... G06N 20/00 |
| 2022/0164910 A1* | 5/2022 | Gu ......................... G06Q 30/08 |
| 2023/0358546 A1* | 11/2023 | Broadway ............ G01C 21/005 |

FOREIGN PATENT DOCUMENTS

| | | | | |
|---|---|---|---|---|
| CN | 112183589 A | * | 1/2021 | ........... G06K 9/6218 |
| EP | 3739296 A1 | | 11/2020 | |

OTHER PUBLICATIONS

English translation of CN-110223515-B (Year: 2021).*
International Search Report and Written Opinion dated Jun. 30, 2022 which was issued in connection with PCT/SG2022/050182.

* cited by examiner

100

102     Receiving a periodic request to update vehicle information, including vehicle position information 104     Translating a vehicle position of a plurality of vehicles to a vehicle position on a graph 106     Updating vehicle information, including updating the vehicle position on the graph

110

112    Receiving a ride request

114    Determining a position of the ride request and translating the position to a position on a graph 116    Traversing the graph, from the position of the ride request, to search for vehicle objects on the graph 118    Determining a shortest driving distance between the one or more vehicles found on the graph and the ride request postion

200

800 nearby request 802    (latlon, filter params)

Proxy

Nearby request → nearby object
latlon → mapID
routetable.get(mapID) → node address

804 round-robin select

Node
810 find Model by mapID

Model
820 a list of Phantom Nodes

K Nearest Drivers

METHODS, DEVICES FOR REAL-TIME NEAREST NEIGHBOUR SEARCH ON A ROAD SYSTEM

The present invention is a 371 of International Application No. PCT/SG2022/050182, filed on Mar. 30, 2022, and claiming priority to Singapore Application No. 10202103788P filed on Apr. 14, 2021, incorporated by reference herein in its entirety.

TECHNICAL FIELD

Various aspects of the present disclosure relate to methods and devices for determining nearest neighbour vehicles on a road system in real-time.

BACKGROUND

Ride-hailing applications utilize vehicle position information to match a vehicle with a ride-hailing application user. A ride-hailing application user may request a ride from the user's ride request position. Ride-hailing applications may use a vehicle's position to match a vehicle and a ride-hailing application user based on the ride request position. However, as the vehicle drives along a road system, the vehicle's position may change. Therefore, real-time vehicle position information is desirable for providing an uninterrupted user experience. Additionally, a vehicle with the shortest distance, by straight-line distance, between the vehicle's position and the ride request position may not be the optimal vehicle for the ride request. For example, the vehicle nearest to the ride request position may be driving away from the ride request position on a one-way road. Therefore, there is a need to consider the road system information when determining a vehicle's driving distance and matching a vehicle with a ride request.

SUMMARY

Various embodiments concern a ride-hailing method for updating vehicle information, including position information. The ride-hailing method may update vehicle information with high frequency. According to various embodiments, the ride-hailing method may include a frequency parameter configured to define the vehicle update frequency. Vehicle information may include geographical position, velocity, and/or direction.

Additionally, various embodiments concern a ride-hailing method for determining a driving distance between the vehicles in the vicinity of the ride request position. The driving distance may include a distance a vehicle may travel along the road system to the ride request position. Determining the driving distance may include vehicle information and/or map data. The ride-hailing method may determine the nearest vehicle(s) based on the driving distance to the ride request position.

According to various embodiments, the ride-hailing method may determine a vehicle's estimated time of arrival at the request position.

According to various embodiments, the ride-hailing method may update a vehicle's information, including position information.

According to various embodiments, the ride-hailing method may determine the driving distance, using map data. The map data may include traffic, road type (interstate, local road), and/or vehicle information.

According to one embodiment, a device may be configured to carry out the ride-hailing method of determining the nearest vehicle(s).

According to one embodiment, a non-transitory computer-readable medium may store computer executable code including instructions for the ride-hailing method of determining the nearest vehicle.

According to one embodiment, a computer executable code including instructions for carrying out the ride-hailing method of determining the nearest vehicle.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1A:
FIG. 1A shows an exemplary flow chart for a method of updating vehicle information, in accordance with various embodiments.
Figure 1A:
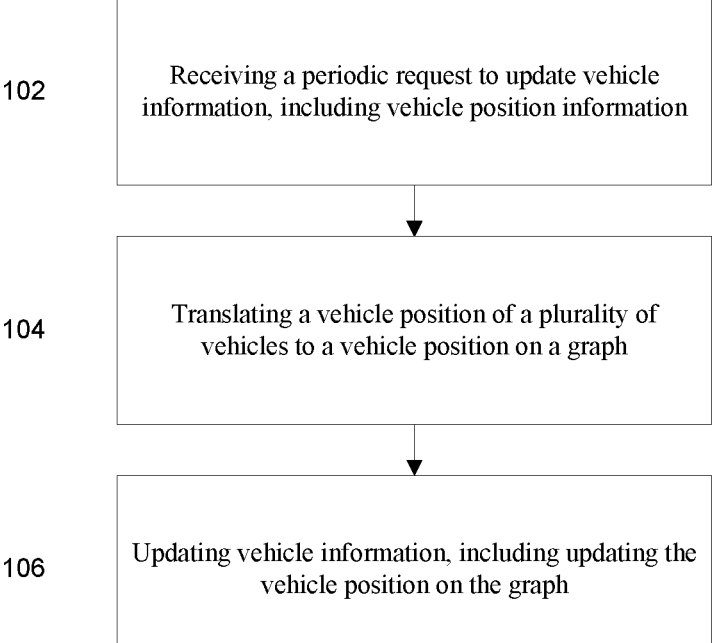

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized, structural and logical changes may be made without departing from the scope of the disclosure. The various embodiments are not necessarily mutually exclusive, as some embodiments can be combined with one or more other embodiments to form new embodiments.

Embodiments described in the context of one of the enclosed assemblies, vehicles, or methods are analogously valid for the other enclosed assemblies, vehicles, or methods. Similarly, embodiments described in the context of an enclosed assembly are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein and in accordance with various embodiments, the expression "method for" may also include the meaning of "method of".

As used herein and in accordance with various embodiments, the expressions "node feature" and "node vector" (and its plural forms) may be used interchangeably.

As used herein and in accordance with various embodiments, the term position or position information may include geographical data, such as geospatial coordinate and may further include time, for example, as provided by the global positioning system GPS. The GPS coordinates may according to the World Geodetic System, WGS 84, for example, version G1674.

For the identification of a vehicle on a road system, the position information is real world data, for example real world GPS data. Correspondingly, the geographical perimeter represents a perimeter on earth's surface.

As used herein and in accordance with various embodiments, the terms "geographical" and "geospatial" may be used interchangeably.

As used herein and in accordance with various embodiments, the terms "vehicle object" and "driver object" may be used interchangeably. A vehicle may be an autonomous vehicle or a human driven vehicle.

The service of ride-hailing relies significantly on digital map data and vehicle information. It is crucial to frequently update vehicle information as vehicles move along a road system. Frequently updating vehicle information ensures that vehicle information is as current as possible. Locating vehicles near a ride request position in real time creates a better ride-hailing experience. For example, ride-hailing requests should identify one or more vehicles near the ride request position, in real time, to increase the chances of the ride request being accepted by a vehicle. One challenge to identifying the vehicles in the vicinity of the ride request position, is that over time the location or position of vehicles may change as vehicles move along a road system. Another challenge is that the straight-line distance between a ride request position and a vehicle may not consider a driving distance. For example, if the nearest vehicle by a straight-line distance is on an interstate highway, it may not be able to reach the ride request position as quickly as another vehicle that has a larger straight-line distance but is driving on local roads. Various embodiments of the present disclosure use map data and vehicle information to determine the nearest vehicles with respect to a ride request position according to driving distance and/or estimated time of arrival from a position of the vehicle to the ride request position.

FIG. 1A illustrates a schematic representation of method 100 for updating vehicle information. Vehicle information is an essential part of a ride-hailing application and having real-time vehicle information may offer an uninterrupted user experience. Method 100 for updating vehicle information may include steps 102, 104, and 106. Step 102 may include receiving a periodic request to update vehicle information, including vehicle position information. For example, the ride-hailing application may identify vehicles equipped for the ride-hailing application driving on a road system. Vehicle update requests may be configured for multiple times every minute. Step 104 may include translating a vehicle position of each vehicle in a plurality of vehicles to a vehicle position on a graph, where the graph represents the road system. Step 106 may include updating vehicle information, including updating the vehicle position on the graph. Additionally, the vehicle update requests may include updating other information such as speed, direction, etc.

Figure 1B:
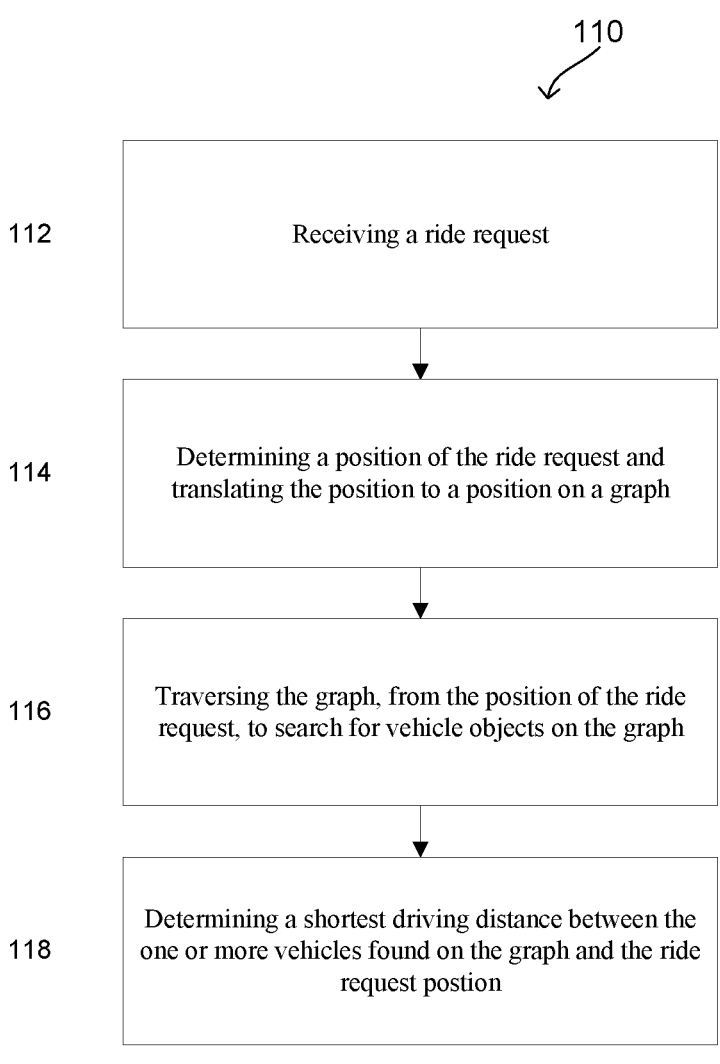
FIG. 1B shows an exemplary flow chart for a method of determining the nearest vehicle(s), in accordance with various embodiments.

FIG. 1B illustrates a schematic representation of method 110 for determining one or more nearest vehicle(s). The method 110 for determining the one or more nearest vehicle(s) may include steps 112, 114, 116, and 118. Step 112 may include receiving a ride request. Step 114 may include determining a position of the ride request and translating the position to a position on a graph. Step 116 may include traversing the graph, from the position of the ride request, to search for vehicle objects on the graph. Step 118 may include determining a shortest driving distance between the one or more vehicles found on the graph and a ride request position, wherein the driving distance includes the distance the vehicle must drive from its position to the ride request position.

Figure 2:
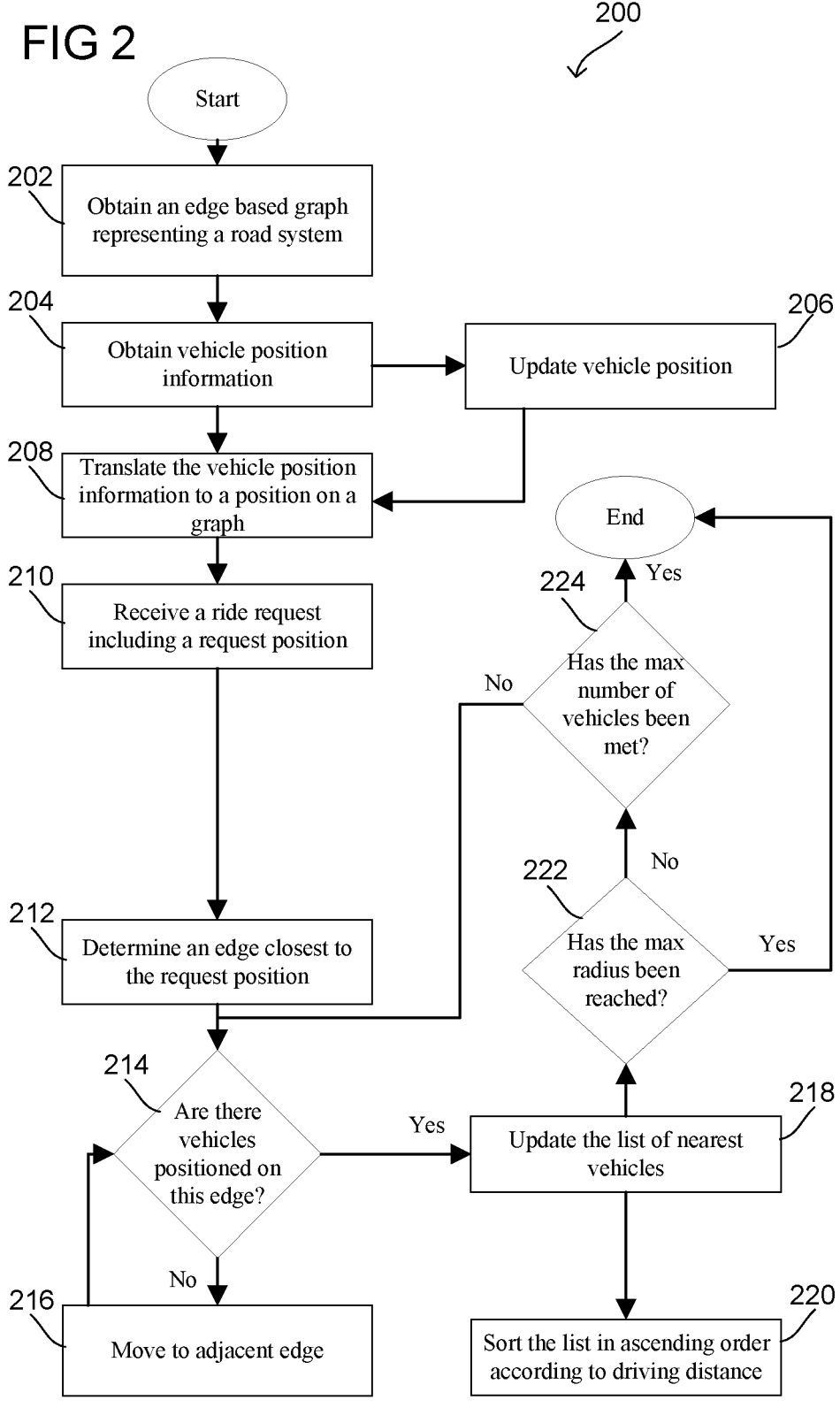
FIG. 2 shows an exemplary flow chart for a method of executing a ride request, in accordance with various embodiments.

FIG. 2 illustrates a schematic representation of method 200 for identifying the nearest vehicles with respect to a ride request position. Method 200 may include some of the same steps as methods 100 and 110. Step 202 may include obtaining a graph based on raw map data. The graph may represent a road system and include a map ID associated with the geographical area the graph represents. Step 204 may include obtaining vehicle positions for a plurality of vehicles. Step 208 may include translating the vehicle positions to positions on edges of the edge-based graph. Step 210 may include receiving a ride request comprising a ride request position. The ride request position may include geographical data.

Step 206 may include updating the vehicle position information for each vehicle object positioned on the graph. After which, the updated vehicle position information for each vehicle object may be used for identifying the nearest vehicles with respect to the ride request position. Note that the vehicle update may occur frequently and independently of the ride request. Step 206 may include the same or similar steps as described in FIG. 1A.

Step 212 may include identifying the closest edge on the graph corresponding to the geographical location of the ride request position. From the identified position on the graph, the search for the nearest neighbour vehicles can begin. The edges nearest the ride request position may be searched for vehicle objects. Step 214 determines if there are any vehicle objects on the graph edges. If there are, the vehicles are added to the list of nearest vehicles at Step 218. If not, the method moves on to an adjacent edge at Step 216 and the process is repeated.

Step 220 may sort the list of nearest vehicles of Step 218 by ascending driving distance as determined in method 110.

Step 222 may determine if the list of nearest vehicles is enough vehicles for the ride request. For example, if there are 30 vehicles within a predefined vicinity of the request position, but it is determined that only 5 vehicles need to be identified to successfully fulfill a ride request, the method may stop searching for more vehicles after the first 5 nearest vehicles are found. Step 224 may include geographical data for an area within a predefined radius of the ride request position. The map data may include a road system located in the geographical area or vicinity of the ride request position and only search the road system within the predefined radius. For example, if there are only 3 vehicles within the predefined radius of the ride request position, method 200 may stop searching for more vehicles to fulfill a ride request. This may be because searching any farther would likely increase the driving distance of any subsequently found vehicles. The farther the vehicle the less likely it is to accept the ride request and increase the wait time for the ride request user.

Figure 3A:
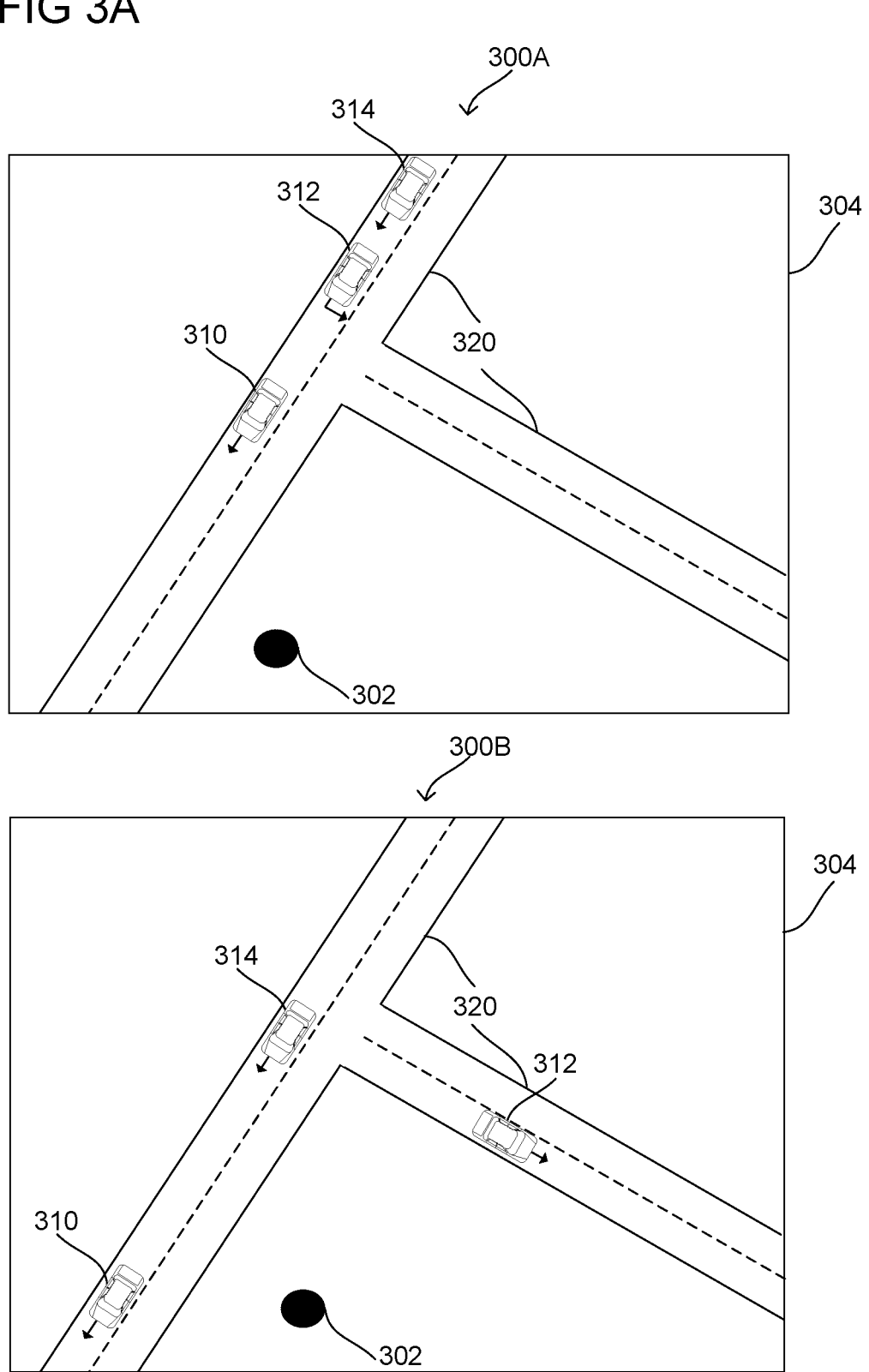
FIGS. 3A and 3B show an exemplary view of a road system, in accordance with various embodiments.

FIG. 3A illustrates how vehicle positions may change over time and may require vehicle updates. Ride request position 302 which may include a geographical position at a first time 300A and a second time 300B. As shown in FIG. 3A, three vehicles 310, 312, and 314 are driving along road system 320. At first time 300A, vehicle 310 is the nearest to ride request position 302. Additionally, at first time 300A, vehicles 312 and 314 are the second nearest and third nearest respectively. At second time 300B, the vehicle's 310, 312, and 314 position relative to ride request position 302 may have changed, affecting the driving distance between vehicles 310, 312, and 314 and ride request position 302.

It is important that a ride-hailing application frequently update vehicle positions to ensure that a ride request is sent to the nearest vehicle or vehicle with the shortest driving distance. For example, at first time 300A, vehicle 310 may reject a ride request from ride request position 302. If the vehicle positions are not updated, a second ride request may be sent at second time 300B to vehicle 312, however that would not be the best choice because vehicle 312 is not on the same road as the ride request position at second time 300B. To select the best vehicle for the ride request, driving distance should be considered. The driving distance may consider vehicle position, speed, direction, rules of the road, the road system, etc. Driving distance may help to infer an estimated time of arrival (ETA) of a vehicle. Ride requests to vehicles associated with shorter ETAs may reduce ride request rejections or cancellations and improve ride request completion rate.

Figure 3B:
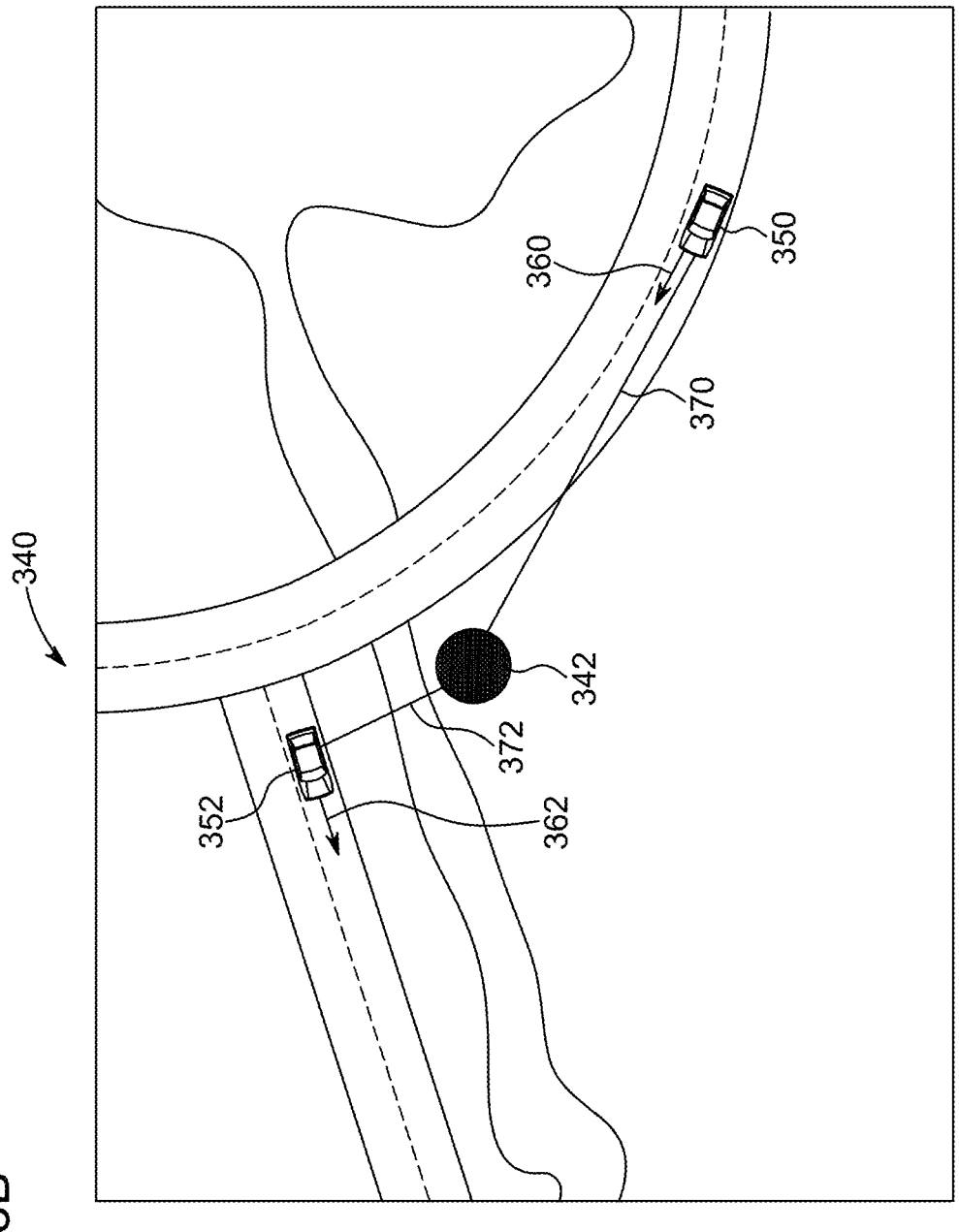

FIG. 3B illustrates a situation where the shortest straight-line distance between a vehicle position and a ride request position may not be the shortest driving distance between the vehicle position and the ride request position. For example, on map portion 340, a ride request may be initiated at ride request position 342. Two vehicles 350 and 352 may be within the vicinity of ride request position 342. Vehicle 350 may be straight-line distance 370 from ride request position 342 and traveling in direction 360. Vehicle 352 may be straight-line distance 372 from ride request position 342 and traveling in direction 362. Distance 372 may be shorter than distance 370. However, because direction 360 is towards ride request position 342 and direction 362 is away from ride request position 342, vehicle 350 may arrive at ride request position 342 earlier as compared to vehicle 352. As such, the ride request should be sent to vehicle 350. It is important that a ride-hailing application consider driving distance to determine the nearest vehicles to a ride request position, this may result in shorter waiting times for ride request users leading to higher user satisfaction and/or lower cancellation rates.

Ride-hailing applications require accurate map data to generate a graph representing a road system. Raw map data may be converted into an edge-based graph (EBG). A graph generating method may divide raw map data including nodes, ways, and relations (including speeds, directions) into segments. The graph generating method may further convert the segments into a compressed edge graph. The graph generating method may generate an EBG from the compressed edge graph, as described below, to effectively determine routing along a road system.

Below we describe one example of how to convert raw map data into a graph for the ride-hailing application. Other methods of generating a graph to determine routing may be used. Raw map data may be collected from an open-source map (OSM) which includes nodes, ways, and relations. A node may represent a point on the map including geographical data. A way may connect two or more nodes and thus may be represented by a line containing one or more segments and may include a speed limit or other road rule information. Multiple ways may share the same node where two ways intersect. A relation describes the relationship between several nodes or ways or a combination of both. A relation may describe turn restrictions, routes, etc. A relation is often not a physical structure, but an abstraction such as a bus route.

Figure 4:
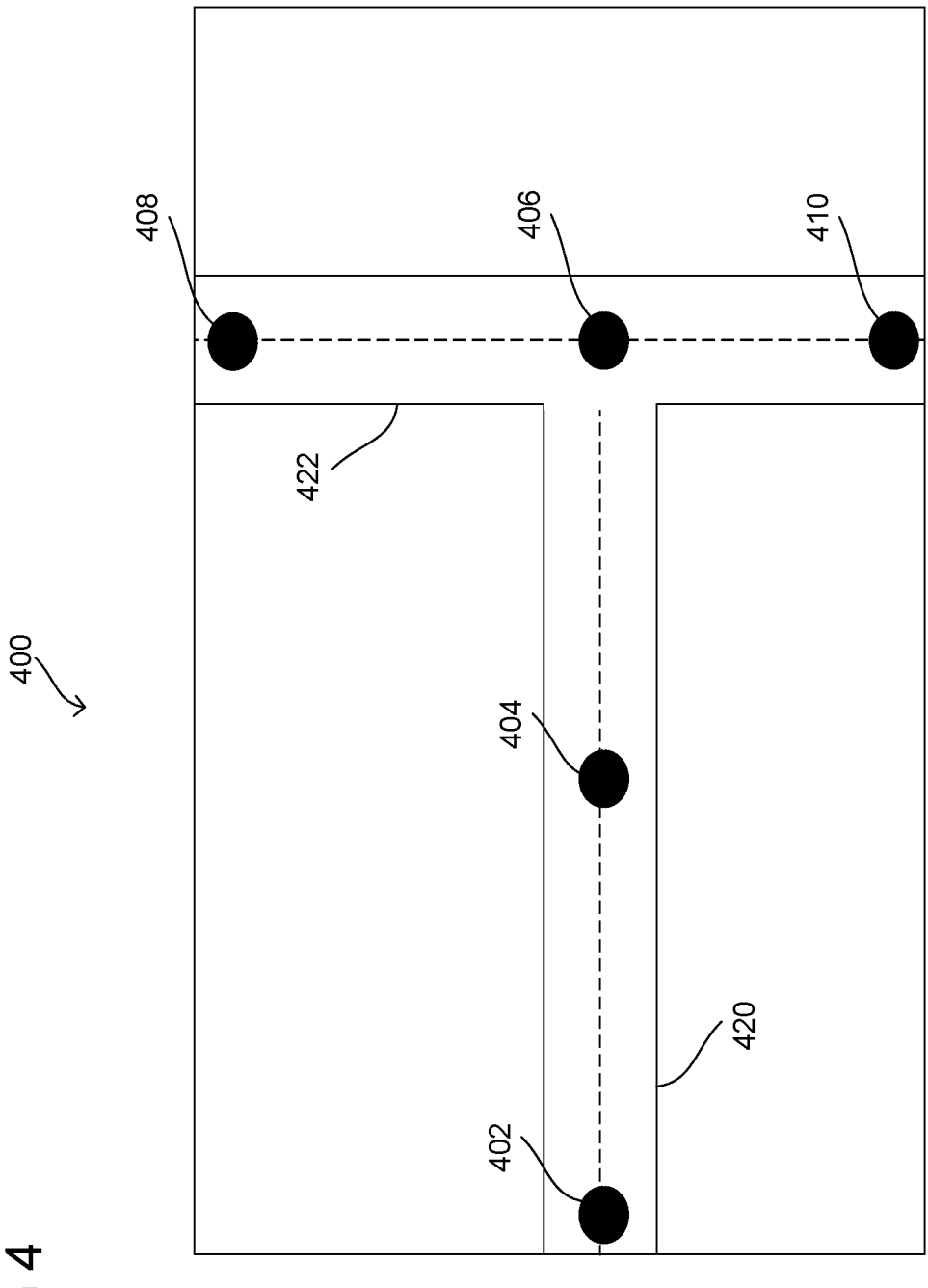
FIG. 4 shows exemplary map nodes and ways of raw map data, in accordance with various embodiments.

FIG. 4 illustrates several nodes and ways provided by raw OSM map data. The graph generating method may transform the OSM map data into an edge expanded graph or edge-based graph (EBG), which may be more suited for modelling turn costs and turn restrictions. For example, an OSM may represent a road system containing two ways 420 and 422, including five nodes 402, 404, 406, 408, and 410. A first way 420 may include nodes 402, 404, and 406 to represent a first road. A second way 422 may include nodes 408, 406, and 410 to represent a second road. The first way 420 may intersect the second way 422 at node 406. The ways may be divided into individual segments for a pair of nodes: 402-404, 404-406, 406-408, and 406-410. For each segment in the OSM, two nodes are created for the EBG, one for each direction of the segment. These may be referred to as edge-based nodes. For example, an edge-based node (EBN) on the EBG may represent the direction from node 402 to node 404 (402-404) and another EBN on the EBG may represent the direction from node 404 to node 402 (404-402). An edge may be generated for every possible movement between two EBNs. This may be referred to as an edge-based edge (EBE). An EBE may be defined as a pair of EBNs, fromNode—toNode and represent moving from one EBN to another EBN. The previously described EBNs (402-404) and (404-402) are two examples.

The EBG may include EBNs and EBEs. EBNs represent a specific direction (forward or backward) of an OSM segment. There are two EBNs for a two-way segment. However, there is only one EBN for a one-way segment. EBEs connect EBNs and represent transitioning from moving in a specific direction of one OSM segment, to moving in a specific direction of another (or the same) OSM segment. The transition can be either via a turn from one way onto another way, doing a u-turn, or moving from segment to segment along the same way.

As previously noted, other methods may generate a graph suitable for determining routing.

Figure 5:
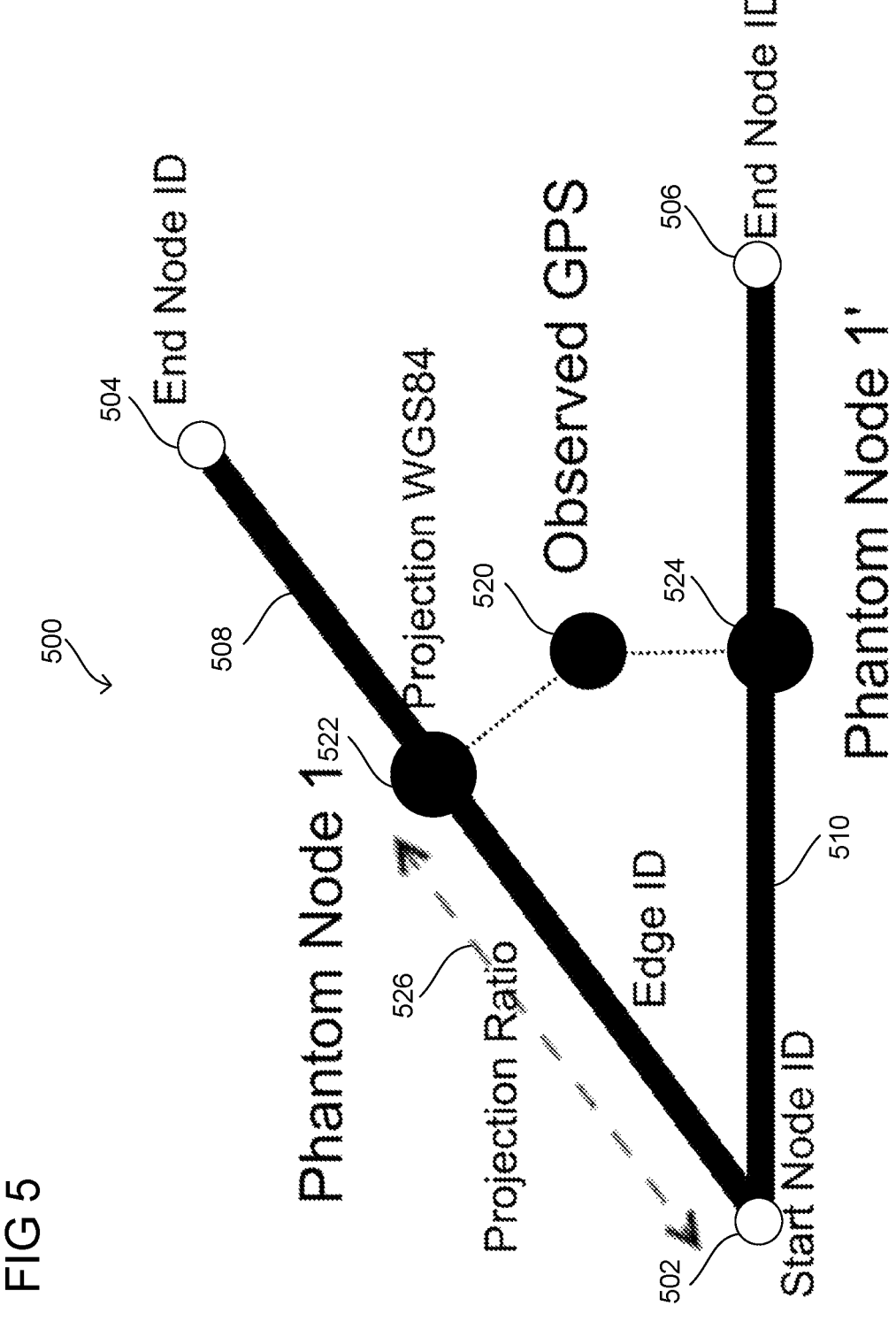
FIG. 5 shows an exemplary method for translating a vehicle position to a vehicle object position within an edge-based graph (EBG)

FIG. 5 illustrates an edge-based graph (EBG) 500 representing a road system within the vicinity of a ride request position 502. EBNs 508 and 510 may represent a movement between the node-based nodes (NBN) 502, 504, and 506 representing the road system within the vicinity of the request position 502. The EBNs may be defined by a pair of NBNs 502, 504, and 506 to describe the direction of travel along a segment of the road system. The ride-hailing application may obtain vehicle objects and may generate phantom nodes 522 or 524 representing vehicle objects on EBG 500. For example, vehicle object 520 may include a GPS location. Based on the vehicle object's 520 GPS location, a method may determine the position of vehicle object 520 falls between EBNs 508 and 510. Because a vehicle should be located on the road system, the method may add a phantom node 522 or 524 to EBG 500 to represent the vehicle object 520. The method may project the phantom node to the nearest EBN 508 or 510 by drawing perpendicular lines from the geographic location to the EBNs. The projected point is denoted as a phantom node. The method may choose between phantom nodes 522 or 524 based on which best represents the GPS coordinates of the vehicle object 520. The method may choose phantom nodes 522 or 524 based on a distance between the GPS coordinates of the vehicle object 520 and the phantom nodes 522 or 524, wherein the phantom node with a shortest distance may be chosen. For example, phantom node 522 may be chosen to represent vehicle object 520 because phantom node 522 may best represent the GPS coordinates of vehicle object 520. The method may calculate the projection ratio 526 to represent the difference between the projected position and the observed position. Each phantom node may be merely a memory representation of a vehicle on the EBG and not actually added to EBG 500. Each phantom node may contain information about its projected position such as the ID of the nearest edge-based node (EBN) to its projected position, and projection ratio, etc. The nearest phantom node is bound to the original vehicle position 520 to provide information about the vehicle position on the EBG.

Figure 6:
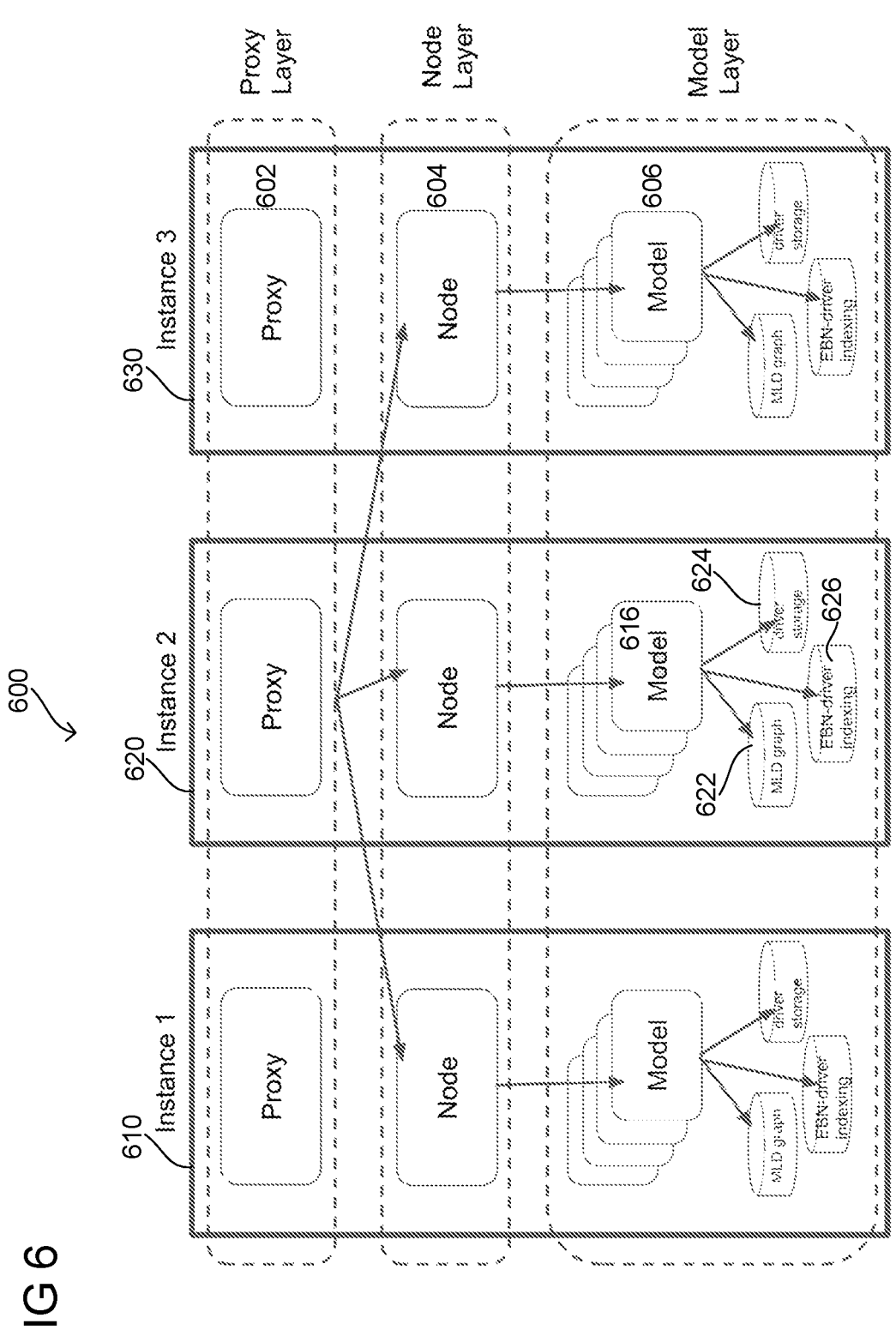
FIG. 6 shows an exemplary architecture for determining the nearest vehicle, in accordance with various embodiments.

FIG. 6 illustrates an exemplary architecture 600 of a ride-hailing solution. In an embodiment, the exemplary architecture 600 may include a computer program product. The computer program product may store the computer executable code including instructions for identifying K nearest vehicles according to the various embodiments. In an embodiment, the computer executable code may be a computer program. In an embodiment, the computer program product may be a non-transitory computer-readable medium.

The architecture 600 may include a proxy layer 602, node layer 604, and model layer 606. Each instance 610, 620, and 630 includes each of layers 602, 604, and 606. Proxy layer 602 may receive vehicle update requests and/or ride requests and distributes the requests according to a map ID included in the request. The map ID may identify a partition of a graph which represents a geographic region or city. The proxy may check the current instance for the map ID or review a RouteTable for the map ID to determine which instances of the ride-hailing solution include the map ID. The RouteTable may contain a mapping from a map ID to the IP addresses of the instances which contains the models including the map ID. As shown, proxy layer 602 of instance 620 may receive the request. Proxy 602 may forward the request to a node on a different instance (device) if the map ID is included in the different instance. For example, instances 610, 620, and 630 may be stored on separate devices.

Each node of node layer 604, may store an index of map IDs for the one or more models 616 of model layer 606. When a node of node layer 604 receives the request from proxy layer 602, the node identifies the correct model 616 by map ID and forwards the request to the correct model 616. When the correct model 616 receives the request from node layer 604 the model 616 may execute the request.

Each model 616 of model layer 606 may store vehicle information. Model 616 may receive a vehicle object from a proxy layer and/or node layer. Each vehicle object may include vehicle information including, a vehicle ID, map ID, vehicle capacity, status, vehicle position (GPS coordinates), and other metadata. The model may determine a map based on the map included in the request. Model 616 may also store a phantom node position on the EBG based on the vehicle position of the vehicle object, as previously discussed. Model 616 may also identify the nearest edge-based node (EBN) to the phantom node on the EBG and store the EBN ID of the nearest EBN with the vehicle object information.

Model 616 may translate the geographic location 520 in FIG. 5 of a vehicle object and project the geographic location to a position on the EBG representing the road system. Projecting the phantom node may return a list of phantom nodes ordered by the haversine distance from the vehicle's geographic location to the phantom node in ascending order.

As previously noted, models may be replicated across different instances for fault tolerance. For example, each model may be replicated across each node of node layer 604. Updating vehicle information in any one of the instances is forwarded to other instances containing replicas for a given map ID. For example, instance 610 may forward a vehicle update request to instances 620 and 630. Multiple models 616 of model layer 606 may be stored in the same node to optimize the instance of the ride-hailing application.

Nodes of node layer 604 may index the models 616 by their map IDs. The ride-sharing application may use adaptable radix trees (ART) to efficiently index vehicles from the EBG. Two ARTs are maintained by each model, a vehicle ART and an EBN ART. A bi-directional indexing may be created between the graph representing the road system and the vehicle objects for efficient indexing and vehicle updating. The vehicle ART may store vehicle objects including vehicle information and use the vehicle ID as an index of vehicles. The EBN ART may use the EBN ID as an index of EBNs. Each EBN may store a list of vehicle objects whose position is on the EBN, where the list of vehicle objects is stored as an ART and the EBN may include a pointer to the root of the vehicle ART.

In an embodiment, model 616 may first check if a vehicle object already exists using its vehicle ID. If it does not exist, model 616 may add the vehicle object to the vehicle ART and EBN ART. If the vehicle object already exists, the new vehicle object will replace the old vehicle object on the vehicle ART. For EBN ART, the old vehicle object on the previous EBN may need to be deleted first before adding the new vehicle object to the current EBN. Every insertion or deletion modifies both ARTs, which might cause changes to roots. As model 616 only stores the roots of ARTs, in order to prevent race conditions, a lock may be used to prevent other read or write operations to access the ARTs while changing the ART roots.

When a vehicle nearby request is received, the roots of two ARTs may be required. In an embodiment, synchronization may be achieved during concurrent vehicle update and nearby requests. For example, when there are two vehicles A and B stored and these two vehicles reside on the same EBN, when there is a nearby request, current roots of the two ARTs are returned. When processing this nearby request, there may be ongoing vehicle updates which may modify the ARTs, e.g. a new root is resulted due to update of vehicle C. The ongoing vehicle updates will not impact ongoing vehicle nearby request as they are using different roots. Subsequent nearby requests will use the new ART roots to find the nearby vehicles. Bi-directional indexing between EBNs and vehicle objects offers efficient retrieval between vehicle objects and EBNs. In practice, vehicle IDs, and EBN IDs may be numerical index keys. ART has a better throughput for numerical keys as compared to sparse keys such as alphabetical keys.

Figure 7:
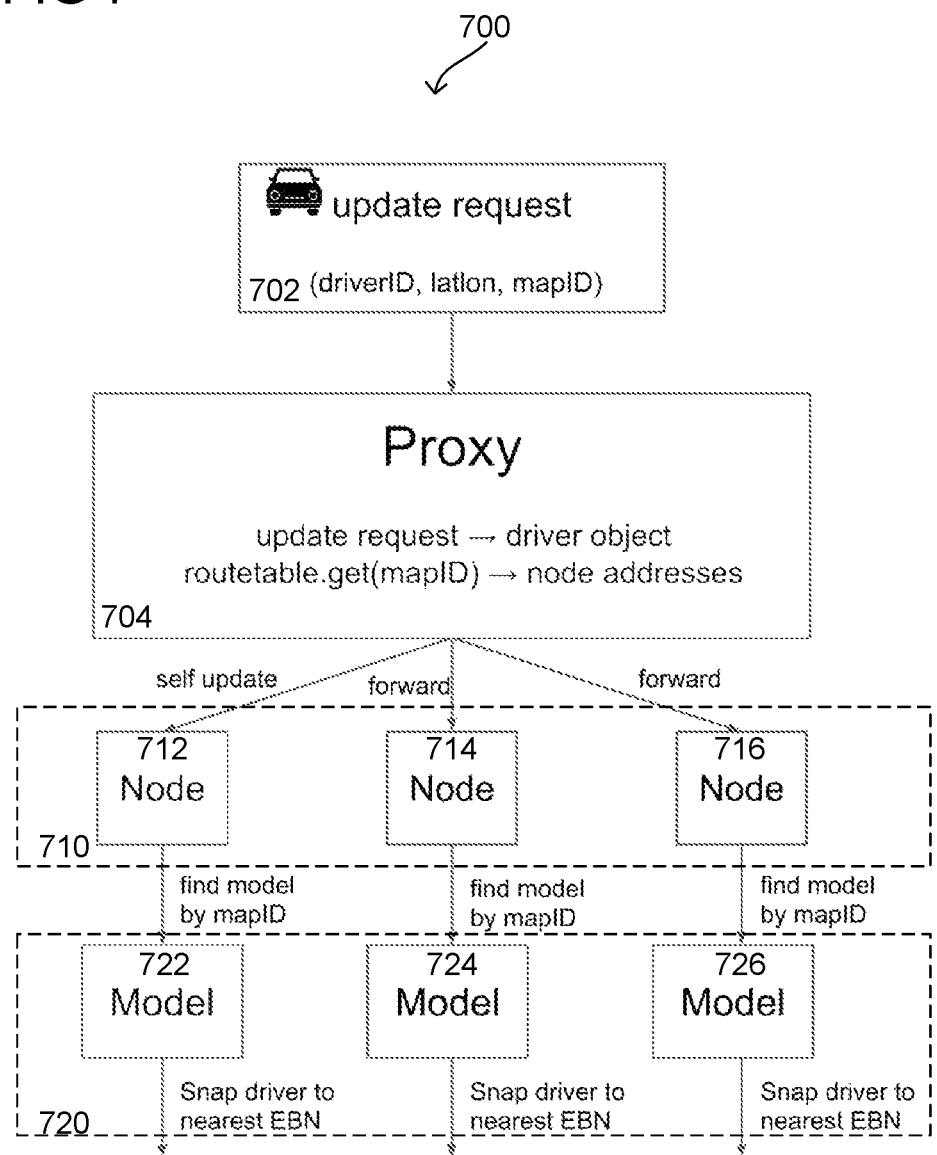
FIG. 7 shows an exemplary flow diagram for updating and storing vehicle position information, in accordance with various embodiments.

FIG. 7 illustrates a vehicle update method 700. Method 700 may use the same architecture as described in FIG. 6. As vehicles move along a road system, method 700 may update vehicle objects to reflect real-time vehicle position information. Method 700 may schedule vehicle updates at periodic intervals to update vehicle information, including a vehicle's geographical location, in real-time. A proxy 704 may receive a vehicle update request 702 and distribute the request according to a map ID included in the vehicle update request. Upon receiving a vehicle update request 702 to update a vehicle object, proxy 704 may determine whether or not a vehicle object already exists for the vehicle ID of the vehicle update request. The process for adding new vehicle objects or updating existing vehicle objects is similar.

If it does not already exist, proxy 704 constructs a vehicle object from the update request 702 information, including vehicle ID, map ID, GPS coordinates, etc. Proxy 704 may determine which instances include the map ID included in the vehicle update request by checking the current instance and/or reviewing the RouteTable. If the map ID is included in the current instance a self-update is performed. For example, node 712 of the current instance may include the map ID of the vehicle update request and be on the same device as proxy 704 as shown in FIG. 7. If the map ID is included in on other instances the vehicle update request is forwarded to those other instances. For example, nodes 714 and 716 may be on separate devices and include the map ID. Proxy 704 may review the RouteTable to determine the IP addresses of nodes 714 and 716 and forward the vehicle update request to nodes 714 and 716 as shown in in FIG. 7. Proxy 704 uses the unique map ID as the key to review a RouteTable and get the IP addresses of all instances containing a vehicle object with the same unique map ID Each instance is capable of determining that the update request is received from a proxy of a different instance (on a different device). If the instance determines that the update request 702 is received from a different instance, the update request and/or vehicle object will be forwarded directly to the node without checking the RouteTable because the proxy that originally received the vehicle update request would have already reviewed the RouteTable.

Nodes 722, 724, and 726 of node layer 720 may identify a model based on the unique map ID of the vehicle update request and/or vehicle object. Nodes 722, 724, and 726 may determine a vehicle object position on an EBN of the EBG based the vehicle position information. Then the vehicle object is updated on both the EBN and Vehicle ARTs as previously described. If proxy 704 does not find the map ID of the vehicle object on the current instance 712, nothing will be done, and no error will be raised. This is because if the instance 712 does not include the map ID of the vehicle update request, the model containing the map ID is stored on other instances and proxy 704 will forward the vehicle update request 702 to other instances, 714 and 716, that includes the map ID. It may be observed that the scalable in-memory solution may maintain eventual consistency instead of strong consistency. In practice, eventual consistency favors high throughput over a slight inconsistency of K-nearest neighbours (KNN) query results as the latter does not affect allocation performance significantly.

The node identifies the map ID of the vehicle update request and looks it up in a bi-directional index between the EBN ART and the vehicle ART to determine the correct model. The node forwards the vehicle object to the correct model. The model updates and stores the vehicle object information as previously described.

Figure 8:
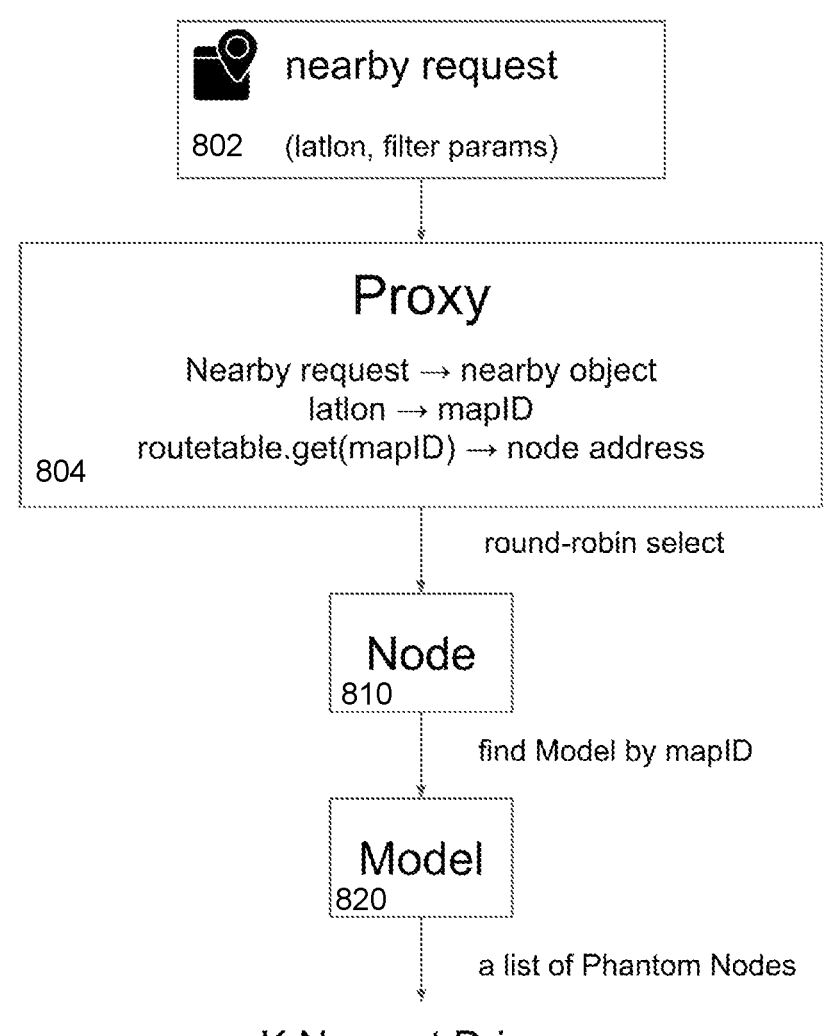
FIG. 8 shows an exemplary flow diagram for generating a list of nearest vehicles, in accordance with various embodiments.

FIG. 8 illustrates a nearby vehicle request method 800 based on a ride request. Nearby vehicle request method 800 may use the same architecture as described in FIG. 6. A user-initiated ride request may trigger a nearby vehicle request. A nearby vehicle request may be received from upstream and distributed to one of the instances of the ride-hailing application. Each instance may be on a different device. Upon receiving the nearby vehicle request from upstream a load balancing technique may distribute the request to a proxy, such as proxy 804 of the proxy layer. Proxy 804 may convert the nearby vehicle request to a nearby vehicle object. Each model 820 may be associated with a map ID for simplified lookup. Proxy 804 may check to determine if the current instance includes the map ID. If the current instance includes the map ID, the nearby vehicle object is passed to the node of the current instance to execute the nearby vehicle request, for example node 810. If the current instance does not include the map ID, the proxy may review a RouteTable, indexed by map ID, to determine which instances include the map ID and may serve the nearby vehicle request. For example, a load balancing technique may implement a round-robin to select one instance from the determined instances containing the map ID of the nearby vehicle request. After determining the one instance for the nearby vehicle request, the proxy forwards the nearby vehicle request to the one instance. The proxy layer is configured to determine that the nearby vehicle request is received from another machine and directly passes the nearby vehicle object to the node of the node layer. Upon receiving the nearby vehicle object, node 810 searches for the correct model based on the unique map ID as the key for searching. For example, node 810 may determine that model 820 is the correct model and passes the nearby vehicle object to model 820. Model 820 executes a KNN search for the nearest vehicle objects. The search may be configured to look for a fixed number of vehicle objects or all the vehicle objects within a predefined distance of the ride request position. For example, model 820 may execute a KNN search by translating the position of the ride request to a phantom node and use this phantom node as the start node for expansion of the EBG as discussed below.

Starting from the start node on the EBG, a K nearest vehicle search begins. Two priority queues are used during the KNN search. An EBNPQ is used to keep track of the nearby EBNs, and a VehiclePQ is used to keep track of vehicles found during expansion. The driving distance between the vehicle and the ride request position is also kept track of in the VehiclePQ.

A snapshot of the current vehicle storage (using roots of current ARTs) is taken prior to executing the KNN search. The snapshot includes vehicle positions on the road system at the time the proxy receives the nearby vehicle request. From each start node, the parent EBN is found and vehicles located on these EBNs are appended to the VehiclePQ. The KNN search expands to adjacent EBNs and appends these EBNs to EBNPQ. After iterating all nodes, there will be some initial vehicles in VehiclePQ and adjacent EBNs that have not been expanded in EBNPQ.

Each time the nearest EBN is removed from EBNPQ, vehicles positioned on this EBN are appended to VehiclePQ. The nearest vehicle in the VehiclePQ is removed, and if the vehicle satisfies the ride request filtering requirements, it is appended to an array of qualified vehicles. This step repeats until the VehiclePQ and returns the list of qualified vehicles. If during this process, the quantity of qualified vehicles reaches the maximum vehicle limit, the KNN search stops and returns the list of qualified vehicles.

After the VehiclePQ becomes empty, adjacent EBNs of the current EBN are expanded and appended to the EBNPQ. This process repeats until a predefined area is has been searched. For example, an area representing a three-kilometer radius of the original start node. The nearest EBN is removed from EBNPQ and vehicles positioned on that EBN are appended to VehiclePQ. The process continues until the EBNPQ is empty. The vehicle array is returned as the result of the nearby vehicle search.

A nearby vehicle request may include a set of filter parameters compared to vehicle metadata to match the user ride request with a vehicle in a KNN search. The filter parameters may be considered business requirements. For example, the user request may request a vehicle with at least 4 available seats. The nearby vehicle request method may query vehicle metadata to determine if the vehicle object satisfies the request.

The vehicle metadata may also include an update timestamp. The nearby search may filter vehicles with an expired timestamp. Vehicle metadata may also include vehicle status and particular allocation preferences used for filtering.

A KNN search of the nearest vehicles is described in the following nearby vehicle algorithm:

---
Nearby Vehicle Query Algorithm:
---

```
    Input: phantomNodes, filterParameters
    Output: nearest K vehicles (drivers) by driving distance
    // initialization
 1. driverPQ. Reset( )
 2. ebnPQ. Reset( )
 3. result ← a slice of nearby drivers
 4. for pnode in phantomNodes do
    |        // insert drivers on starting EdgeBasedNode(EBN)s to driverPQ
 5. |    for driver on pnode.EBN do
 6. |    |__   driverPQ ← driver
    |    // insert adjacent EBNs to ebnPQ
 7. |    adjacentEdges ← getBorderEdges(0), pnode.EBN)
 8. |    for ebn in adjacentEBNs do
 9. |__ |__   ebnPQ ← ebn
10. while !ebnPQ.isEmpty( ) do
11. |    minEbn ebnPQ.delMin( )
12. |    for driver on minEbn do
13. |    |__   driverPQ ← driver
14. |    while !driverPQ.isEmpty( ) do
15. |    |    driver ← driverPQ.delMin( )
16. |    |    for filter in filterParams do
17. |    |    |    if !filter(driver) then
18. |    |    |__  |__ continue
    |    |    // only append driver to result if it passes all filters
19. |    |    result ← append(result, driver)
    |    |    // return directly when having enough drivers
20. |    |    if len(result) ≥ driverLimit then
21. |    |__  |__ return result
    |    // expand into adjacent EBNs
22. |    adjacentEbns ← getBorderEdges(0, minEbn)
23. |    for ebn in adjacentEbns do
24. |    |    if outofRange(minEbn) then
25. |    |    |__ continue
26. |__  |__  ebnPQ ← ebn
27. return result.
```

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer-implemented method for identifying a list of nearest vehicles comprising:

determining a starting point on an edge-based graph representing a digital map of a road system, wherein the starting point is positioned on an edge of a plurality of edges of the edge-based graph;

determining whether one or more vehicle objects projected as phantom nodes, representing real-time position of the one or more vehicle objects, on the edge-based graph are positioned on the edge, and if one or more vehicle objects are positioned on the edge, appending the one or more vehicle objects to the list of nearest vehicles;

maintaining a bi-directional index between the vehicle objects and the vehicle objects projected as phantom nodes on the edge-based graph; and traversing an adjacent edge of the plurality of edges and determining whether one or more further vehicle objects projected as phantom nodes on the edge-based graph are positioned on the adjacent edge, and if one or more further vehicle objects are positioned on the adjacent edge, appending the one or more further vehicle objects to the list of nearest vehicles.

2. The method of claim 1, further comprising determining a driving distance for at least one of the vehicle objects, wherein the driving distance comprises a distance along the edges between the starting point and a position of the at least one of the vehicle objects.

3. The method of claim 2, further comprising comparing the driving distance for two or more of the vehicle objects; and determining a shortest driving distance based on the comparison.

4. The method of claim 2, further comprising determining an estimated time of arrival for the at least one vehicle object based on the driving distance, wherein the estimated time of arrival comprises a time to travel from the position of the at least one vehicle and the starting position.

5. The method of claim 4, further comprising comparing the estimated time of arrival for two or more of the vehicle objects; and determining a shortest time based on the comparison.

6. The method of claim 1, wherein each of the plurality of edges comprises geographical data.

7. The method of claim 1, wherein each of the one or more vehicle objects comprises geographical data.

8. The method of claim 1, further comprising:

periodically updating locations of each of the one or more vehicle objects to obtain one or more updated vehicle object locations.

9. The method of claim 8, further comprising:

determining whether the one or more vehicle objects projected as phantom nodes on the edge-based graph are positioned on the edge based on the one or more updated vehicle object locations.

10. A method for identifying a nearest vehicle comprising:

receiving a ride request comprising a request position;

obtaining vehicle information of a plurality of vehicles, wherein the vehicle information comprises a first vehicle position identifier;

converting the first vehicle position identifier of each of the plurality of vehicles to a second vehicle position identifier on an edge-based graph, wherein the edge-based graph represents a digital map of a road system and the second vehicle position identifier is a phantom node representing a real-time projection of the first vehicle position identifier on the edge-based graph;

maintaining a bi-directional index between vehicle objects and the vehicle objects projected as phantom nodes on the edge-based graph; and determining a driving distance between the second vehicle position identifier of at least one of the plurality of vehicles and the request position, wherein the driving distance comprises a path along the edge-based graph from the second vehicle position identifier of at least one of the plurality of vehicles and the request position and wherein the driving distance is a fastest path between the second vehicle position identifier and the request position.

11. The method of claim 10, further comprising:

obtaining map data, wherein the map data comprises geographical data;

converting the map data to the digital map of the road system comprising a plurality of edges and a plurality of nodes, wherein the plurality of edges and the plurality of nodes comprise geographical data;

generating the edge-based graph based on the geographical data of the plurality of edges and the plurality of nodes; and overlaying the second vehicle position identifier on the edge-based graph.

12. The method of claim 10, further comprising a traffic delay and further determining the driving distance based on the traffic delay.

13. The method of claim 10, further comprising a traffic rule and further determining the driving distance based on the traffic rule.

14. The method of claim 13, wherein the traffic rule comprises determining that an edge corresponds to a one-way road.

15. The method of claim 10, further comprising comparing the driving distance of two or more vehicles of the plurality of vehicles; and determining a shortest driving distance based on the comparison.

16. The method of claim 15, further comprising sending a message to fulfill the ride request to the vehicle corresponding to the shortest driving distance.

17. The method of claim 10, further comprising:

periodically updating vehicle information of each of the plurality of vehicles to obtain one or more updated first vehicle position identifiers and to convert the updated first vehicle position identifiers to updated second vehicle position identifiers.

18. The method of claim 17, determining the driving distance between the at least one of the plurality of vehicles and the request position based on the one or more updated vehicle information.

19. A non-transitory computer-readable medium comprising instructions which, when the instructions are executed by a computer, cause the computer to carry out a method for identifying a list of nearest vehicles, the method comprising:

determining a starting point on an edge-based graph representing a digital map of a road system, wherein the starting point is positioned on an edge of a plurality of edges of the edge-based graph;

determining whether one or more vehicle objects projected as phantom nodes, representing real-time position of the one or more vehicle objects, on the edge-based graph are positioned on the edge, and if one or more vehicle objects are positioned on the edge, appending the one or more vehicle objects to the list of nearest vehicles;

maintaining a bi-directional index between the vehicle objects and the vehicle objects projected as phantom nodes on the edge-based graph; and traversing an adjacent edge of the plurality of edges and determining whether one or more further vehicle objects projected as phantom nodes on the edge-based graph are positioned on the adjacent edge, and if one or more further vehicle objects are positioned on the adjacent edge, appending the one or more further vehicle objects to the list of nearest vehicles.

* * * * *